(12) United States Patent
Li

(10) Patent No.: US 12,139,201 B2
(45) Date of Patent: Nov. 12, 2024

(54) ALL-TERRAIN VEHICLE

(71) Applicant: SEGWAY TECHNOLOGY CO., LTD., Changzhou (CN)

(72) Inventor: Xiang Li, Changzhou (CN)

(73) Assignee: Segway Technology Co., Ltd., Jiangsu (CN)

( * ) Notice: Subject to any disclaimer, the term of this patent is extended or adjusted under 35 U.S.C. 154(b) by 357 days.

(21) Appl. No.: 17/675,739

(22) Filed: Feb. 18, 2022

(65) Prior Publication Data

US 2022/0266914 A1 Aug. 25, 2022

(30) Foreign Application Priority Data

Feb. 22, 2021 (CN) .......................... 202110199681.9
Feb. 22, 2021 (CN) .......................... 202120395202.6
Feb. 22, 2021 (CN) .......................... 202120395203.0
Feb. 22, 2021 (CN) .......................... 202120395204.5

(51) Int. Cl.
*B62D 23/00* (2006.01)
*B62D 21/18* (2006.01)

(52) U.S. Cl.
CPC ......... *B62D 23/005* (2013.01); *B62D 21/183* (2013.01); *B60Y 2200/124* (2013.01); *B60Y 2200/20* (2013.01)

(58) Field of Classification Search
CPC .... B62D 23/005; B62D 21/183; B62D 33/00; B62D 33/02; B60Y 2200/124; B60Y 2200/20; B60K 13/04
See application file for complete search history.

(56) References Cited

U.S. PATENT DOCUMENTS

| 5,689,953 | A | * | 11/1997 | Yamashita | ................ F01N 3/05 180/68.1 |
| 6,170,597 | B1 | * | 1/2001 | Fukuda | ................ F16H 37/021 474/84 |
| 8,210,297 | B2 | * | 7/2012 | Kalisz | ................ B60K 13/02 180/68.2 |

(Continued)

FOREIGN PATENT DOCUMENTS

| CN | 207018117 U | * | 2/2018 |
| CN | 109026462 A | | 12/2018 |

(Continued)

OTHER PUBLICATIONS

The State Intellectual Property Office of People's Republic of China, OA for CN application 202110199681.9 with English translation.

*Primary Examiner* — James A Shriver, II
*Assistant Examiner* — Michael T. Walsh
(74) *Attorney, Agent, or Firm* — Harter Secrest & Emery LLP; Timothy W. Menasco, Esq.

(57) ABSTRACT

An all-terrain vehicle includes a frame, a passenger compartment, a cargo compartment, an engine, an air intake assembly and an exhaust assembly. The engine is coupled to the frame and located under the cargo compartment, the engine has an engine intake port and an engine exhaust port arranged in two sides of a cylinder head of the engine in a length direction of the frame. The air intake assembly is substantially located at a side of the engine in a width direction of the frame, and the exhaust assembly is substantially located at the other side of the engine in the width direction of the frame.

19 Claims, 12 Drawing Sheets

(56) References Cited

U.S. PATENT DOCUMENTS

| | | | |
|---|---|---|---|
| 9,074,343 B2* | 7/2015 | Okuda | F01N 3/2066 |
| 9,327,621 B2* | 5/2016 | Oshima | B60N 2/3013 |
| 10,137,769 B2* | 11/2018 | Kariniemi | B60K 11/08 |
| 10,980,297 B1* | 4/2021 | Augustine | A62B 7/10 |
| 11,371,477 B2* | 6/2022 | Takamura | F02M 35/1216 |
| 2007/0012495 A1* | 1/2007 | Shannon, Jr. | F01N 13/082 |
| | | | 180/68.1 |
| 2009/0000587 A1* | 1/2009 | Seko | F02M 35/1255 |
| | | | 123/184.57 |
| 2015/0375614 A1* | 12/2015 | Osaki | F02M 35/162 |
| | | | 296/184.1 |
| 2019/0118884 A1* | 4/2019 | Spindler | B60K 5/00 |

FOREIGN PATENT DOCUMENTS

| | | | |
|---|---|---|---|
| CN | 210317533 U | | 4/2020 |
| CN | 210317534 U | * | 4/2020 |
| CN | 210317540 U | * | 4/2020 |

\* cited by examiner

A—A

B-B

ALL-TERRAIN VEHICLE

CROSS-REFERENCE TO RELATED APPLICATIONS

This application claims priority to and benefits of Chinese Patent Application Serial Nos. 202120395203.0, 202120395204.5, 202120395202.6 and 202110199681.9, all filed on Feb. 22, 2021, the entire contents of which are incorporated herein by reference.

FIELD

The present disclosure relates to the field of vehicles, and more particularly to an all-terrain vehicle.

BACKGROUND

All-terrain vehicles (ATV) have good off-road performance, and can carry people or cargos. All-terrain vehicles are typically divided into utility all-terrain vehicles and recreational all-terrain vehicles. The utility all-terrain vehicles are generally provided with a cargo compartment at a rear portion of the vehicle, to facilitate loading and transporting of cargos.

SUMMARY

Embodiments of the present disclosure provide an all-terrain vehicle, including a frame; a passenger compartment, a cargo compartment, an engine, an air intake assembly and an exhaust assembly. The passenger compartment and the cargo compartment are mounted on the frame along a length direction of the frame. The engine is coupled to the frame and located under the cargo compartment. The engine has an engine intake port and an engine exhaust port arranged in two sides of a cylinder head of the engine in the length direction of the frame, respectively. The air intake assembly is coupled to the engine intake port, and the air intake assembly is substantially located at a first side of the engine in a width direction of the frame. The exhaust assembly is coupled to the engine exhaust port, and the exhaust assembly is substantially located at a second side of the engine in the width direction of the frame.

Embodiments of the present disclosure further provide an all-terrain vehicle, including: a frame, a passenger compartment, a cargo compartment, an air filter, an engine, and a first air intake pipe. The passenger compartment and the cargo compartment are arranged along a length direction of the frame, the passenger compartment is provided with a backboard close to the cargo compartment, and the backboard defines an air intake port. The air filter and the engine are mounted on the frame, and the air filter and the engine are located under the cargo compartment. The air filter has an air inlet hole and an air outlet hole, and the air outlet hole is coupled to the engine. The first air intake pipe has a first end coupled to the air intake port and a second end coupled to the air inlet hole.

Embodiments of the present disclosure further provide an all-terrain vehicle, including: a frame, a passenger compartment, a cargo compartment, an engine, a transmission, a first air intake pipe and a transmission air intake pipe. The passenger compartment is located at a front side of the cargo compartment. The engine and the transmission are arranged under the cargo compartment, and the transmission is drivingly coupled to the engine. The first air intake pipe has a first end defining a first air intake opening and a second end in communication with the engine. The transmission air intake pipe has a first end defining a transmission air intake port and a second end in communication with the transmission. At least one of the first air intake opening and the transmission air intake port is located between the passenger compartment and the cargo compartment.

DETAILED DESCRIPTION

Figure 1:
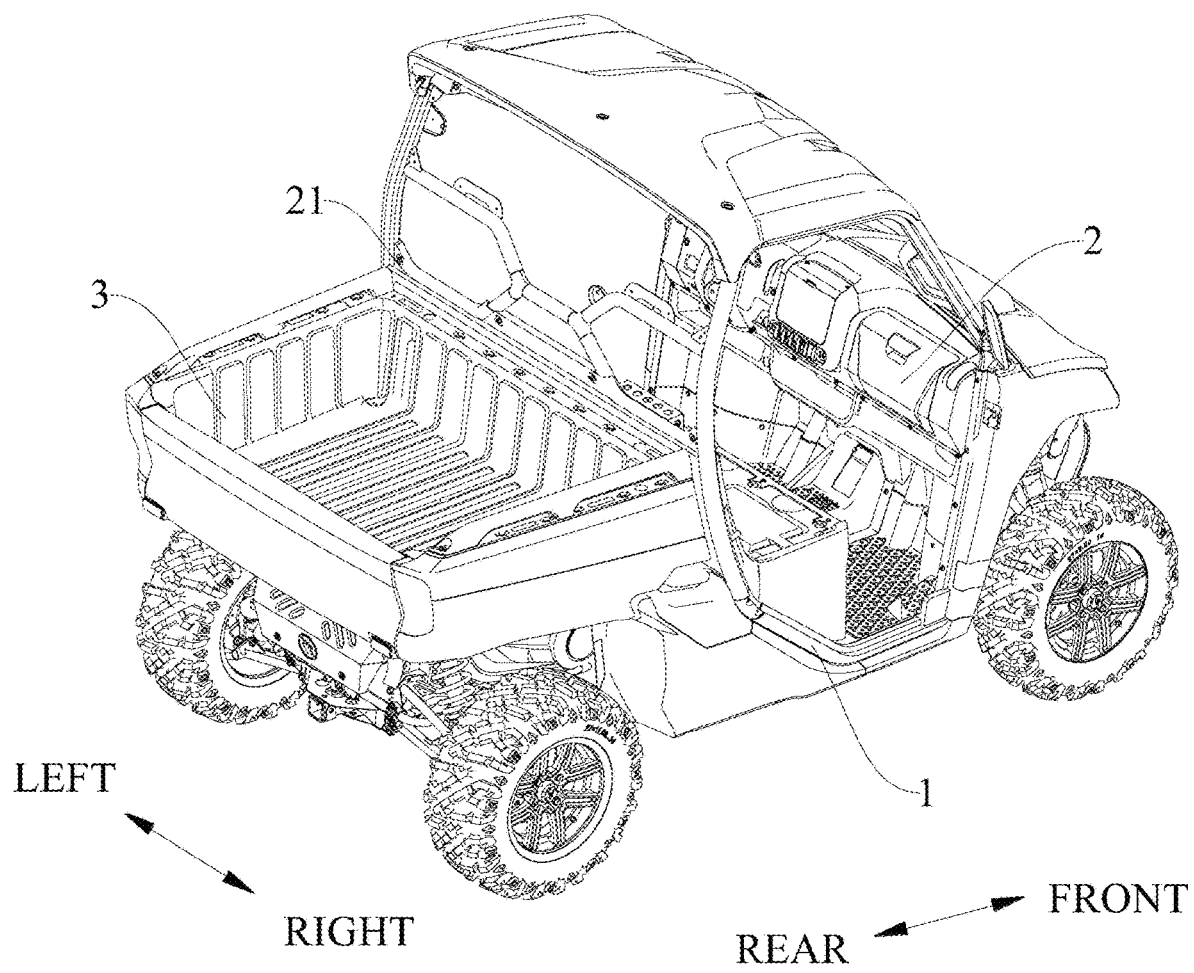
FIG. 1 is a schematic diagram of an all-terrain vehicle according to an embodiment of the present disclosure.

Embodiments of the present disclosure will be described in detail and examples of the embodiments will be illustrated in the drawings. The embodiments described herein with reference to the accompanying drawings are explanatory, which are used to illustrate the present disclosure, but shall not be construed to limit the present disclosure.

In related art, in order to highlight utility of all-terrain vehicles, cargo compartments are typically designed to have large volume, which results in small clearance surrounding engines to limit arrangement of air intake systems and exhaust systems for the engines of the all-terrain vehicles. Hence, it is a critical technical problem needed to be solved by a person skilled in the art that how to properly arrange the air intake systems and the exhaust systems of the engines within limited space of the all-terrain vehicles.

Moreover, in related art, arrangement of air filters of the all-terrain vehicles is limited by the size of the all-terrain vehicle, external pollutant can easily enter the air filter, reducing service life of filter elements of the air filters, increasing replacement frequency of filter elements of the air filter, and increasing use costs.

Additionally, in related art, cargo compartments of utility all-terrain vehicles have large volume, and clearance surrounding engines and transmissions becomes smaller. Thus, this is inconvenient for the air intake and exhaust layout of the engines and the transmissions, affecting performance of the engines and the transmissions.

Embodiments of the present disclosure provide an all-terrain vehicle, including: a frame; a passenger compartment and a cargo compartment, the passenger compartment and the cargo compartment being mounted on the frame in a length direction of the frame; an engine coupled to the frame and located under the cargo compartment, the engine having an engine intake port and an engine exhaust port arranged in two sides of a cylinder head of the engine in the length direction of the frame; an air intake assembly coupled to the engine intake port and is substantially located at a first side of the engine in a width direction of the frame; and an exhaust assembly coupled to the engine exhaust port and substantially located at a second side of the engine in the width direction of the frame.

In some embodiments, the air intake assembly includes an air intake port, an air filter, a first air intake pipe and an expansion chamber. The first air intake pipe has a first end coupled to the air intake port, and a second end coupled to the air filter. The expansion chamber has a first end coupled to the air filter, and a second end coupled to the engine intake port. The expansion chamber is located at a rear side of the engine.

In some embodiments, the passenger compartment has a backboard, the air intake port is defined in the backboard, the first end of the first air intake pipe is coupled to the air intake port, and the second end of the first air intake pipe extends towards an inside of the passenger compartment, passes through the backboard, and is coupled to the air filter.

In some embodiments, the engine exhaust port is defined in a front side of the cylinder head of the engine, the exhaust assembly includes an exhaust pipe and a muffler, the exhaust pipe has a first end coupled to the engine exhaust port, and a second end extending along the second side of the engine in the width direction of the frame to an area behind the engine and coupled to the muffler.

In some embodiments, the muffler is arranged in the width direction of the frame, and the muffler is located behind the engine.

In some embodiments, the air intake assembly also includes a second air intake pipe, the second air intake pipe has a first end coupled to the expansion chamber, and a second end coupled to the air filter, and the second air intake pipe and the expansion chamber are integrally formed.

In some embodiments, the engine includes a transmission, the transmission and the air intake assembly are located at a same side of the engine in the width direction, and the air filter and the second air intake pipe are located above the transmission.

In some embodiments, the air intake port and the air filter are arranged at a rear side of the passenger compartment, and the air filter is located under the air intake port.

In some embodiments, the all-terrain vehicle also includes a transmission air intake port and a transmission air intake pipe, the transmission air intake pipe has a first end coupled to the transmission air intake port, and a second end coupled to an air inlet hole in the transmission, and the transmission air intake port is arranged between the cargo compartment and the passenger compartment.

In some embodiments, the transmission air intake pipe and the second air intake pipe are located at a same side of the engine in the width direction of the frame.

In some embodiments, the all-terrain vehicle further includes a transmission exhaust pipe, the transmission has a transmission exhaust hole, the transmission exhaust pipe is coupled to the transmission exhaust hole, and the transmission exhaust pipe has an outlet direction towards the exhaust assembly.

Embodiments of the present disclosure further provide an all-terrain vehicle, including: a frame; a passenger compartment and a cargo compartment, the passenger compartment and the cargo compartment being arranged along a length direction of the frame, the passenger compartment having a backboard close to the cargo compartment, the backboard defining an air intake port; an air filter and an engine, the air filter and the engine being mounted on the frame and located under the cargo compartment, the air filter having an air inlet hole and an air outlet hole, the air outlet hole being coupled to the engine; and a first air intake pipe having a first end coupled to the air intake port and a second end coupled to the air inlet hole.

In some embodiments, the first end of the first air intake pipe is coupled to the air intake port, and the second end of the first air intake pipe extends towards an inside of the passenger compartment, passes through the backboard and coupled to the air inlet hole of the air filter.

In some embodiments, the first air intake pipe includes a first pipe segment and a second pipe segment, the first pipe segment has a first end coupled to the air intake port and a second end extending towards the inside of the passenger compartment and coupled to a first end of the second pipe segment, and a second end of the second pipe segment passes through the backboard and is coupled to the air inlet hole of the air filter.

In some embodiments, the air intake port has a height not greater than a height of the cargo compartment.

In some embodiments, the all-terrain vehicle further includes a filter shield arranged at the air intake port, and the filter shield is detachably coupled to the backboard.

In some embodiments, the backboard defines a first groove and a second groove, the filter shield is provided with an insertion sheet and an elastic sheet, the insertion sheet is fitted in the first groove, and the elastic sheet is elastically snap-fitted in the second groove.

In some embodiments, the air filter includes a housing and a filter element, and the filter element is arranged in the housing in a height direction of the frame.

In some embodiments, the passenger compartment is provided with a driver seat and a passenger seat, the air intake port is arranged behind the driver seat, or the air intake port is arranged behind the passenger seat, or the air intake port is arranged between the driver seat and the passenger seat.

In some embodiments, the all-terrain vehicle further includes an expansion chamber, the expansion chamber has a first end coupled to the air outlet hole, the engine has a throttle valve, and the expansion chamber has a second end coupled to the throttle valve.

In some embodiments, the expansion chamber has a first channel for passage of air, the throttle valve has a second channel for passage of air, and a ratio of a minimum cross-sectional area of the first channel to a cross-sectional area of the second channel is greater than or equal to 1.4.

Embodiments of the present disclosure further provide an all-terrain vehicle, including: a frame; an engine fixed on the frame; a transmission coupled to the engine and arranged at a side of the engine; a transmission air intake pipe having a first end defining a plurality of transmission air intake ports and a second end in communication with the transmission; and a transmission exhaust pipe having a first end in communication with the transmission and a second end in communication with an atmosphere.

In some embodiments, at least part of the transmission air intake ports is oriented towards a left side or a right side of the all-terrain vehicle.

In some embodiments, the transmission defines a plurality of air inlet holes, the second end of the transmission air intake pipe defines a plurality of communication openings, and the plurality of communication openings are in communication with the plurality of air inlet holes in one-to-one correspondence.

In some embodiments, the air inlet holes includes a first air inlet hole and a second air inlet hole arranged in a front-rear direction of the transmission, the communication openings includes a first communication opening and a second communication opening, the first communication opening is coupled to the first air inlet hole, and the second communication opening is coupled to the second air inlet hole.

In some embodiments, the transmission air intake pipe includes a hard pipe segment and a soft pipe segment, the soft pipe segment has a first end in communication with the transmission, and a second end in communication with a first end of the hard pipe segment, and the plurality of transmission air intake ports are defined in a second end of the hard pipe segment.

In some embodiments, the all-terrain vehicle further includes a filtering screen, and the filtering screen is arranged at the transmission air intake ports.

In some embodiments, the first end of the transmission air intake pipe is provided with an air intake pipe head, the air intake pipe head extends upwards from the transmission air intake pipe, and the transmission air intake ports are defined in a side of the air intake pipe head.

In some embodiments, the all-terrain vehicle further includes an exhaust assembly, the exhaust assembly is coupled to the engine, and the second end of the transmission exhaust pipe is opened towards the exhaust assembly.

In some embodiments, the all-terrain vehicle further includes a passenger compartment and a cargo compartment, the passenger compartment and the cargo compartment are arranged along a length direction of the all-terrain vehicle, and the transmission air intake ports are located between the passenger compartment and the cargo compartment.

In some embodiments, the transmission air intake port has a height not greater than a height of the cargo compartment.

Embodiments of the present disclosure further provide an all-terrain vehicle, including: a frame; a passenger compartment and a cargo compartment, the passenger compartment being located at a front side of the cargo compartment; an engine and a transmission, the engine and the transmission being arranged under the cargo compartment, the transmission being drivingly coupled to the engine; a first air intake pipe and a transmission air intake pipe, the first air intake pipe having a first end defining a first air intake opening and a second end in communication with the engine, the transmission air intake pipe having a first end defining a transmission air intake port and a second end in communication with the transmission, at least one of the first air intake opening and the transmission air intake port being located between the passenger compartment and the cargo compartment.

In some embodiments, the first air intake opening has a height not greater than a height of the cargo compartment, and/or, the transmission air intake port has a height not greater than a height of the cargo compartment.

In some embodiments, the first air intake opening and the transmission air intake port are located between the passenger compartment and the cargo compartment.

In some embodiments, the first air intake opening is opened towards the cargo compartment.

In some embodiments, the transmission air intake port is opened towards a left side or a right side of the frame in the width direction.

In some embodiments, the passenger compartment includes a driver seat and a passenger seat, the first air intake opening is located behind the passenger seat, and the transmission air intake port is located between the driver seat and the passenger seat.

In some embodiments, the passenger compartment is provided with a backboard, the backboard defines an air intake port, the first end of the first air intake pipe is in communication with the air intake port, the first air intake pipe extends from the air intake port towards an inside of the passenger compartment, passes through the backboard and is coupled to the engine through the second end of the first air intake pipe.

In some embodiments, the all-terrain vehicle further includes a filter shield, the filter shield is arranged at the air intake port, and the filter shield is detachably coupled to the backboard.

As illustrated in FIGS. 1 to 7, an all-terrain vehicle according to embodiments of the present disclosure includes a frame 1, a passenger compartment 2, a cargo compartment 3, an engine 4, an air intake assembly 5, and an exhaust assembly 6.

As illustrated in FIG. 1, the frame 1 is a foundation of the all-terrain vehicle and configured to mount various parts and components. The passenger compartment 2 and the cargo compartment 3 are mounted on the frame 1, and the passenger compartment 2 is located at a front side of the cargo compartment 3. In other words, the passenger compartment 2 and the cargo compartment 3 are arranged along a length direction of the frame 1 (e.g. a front-rear direction indicated by an arrow in FIG. 1). A gap 21 is defined between the passenger compartment 2 and the cargo compartment 3, the passenger compartment 2 is located at a front portion of the frame 1, and the cargo compartment 3 is located at a rear portion of the frame 1.

Figure 2:
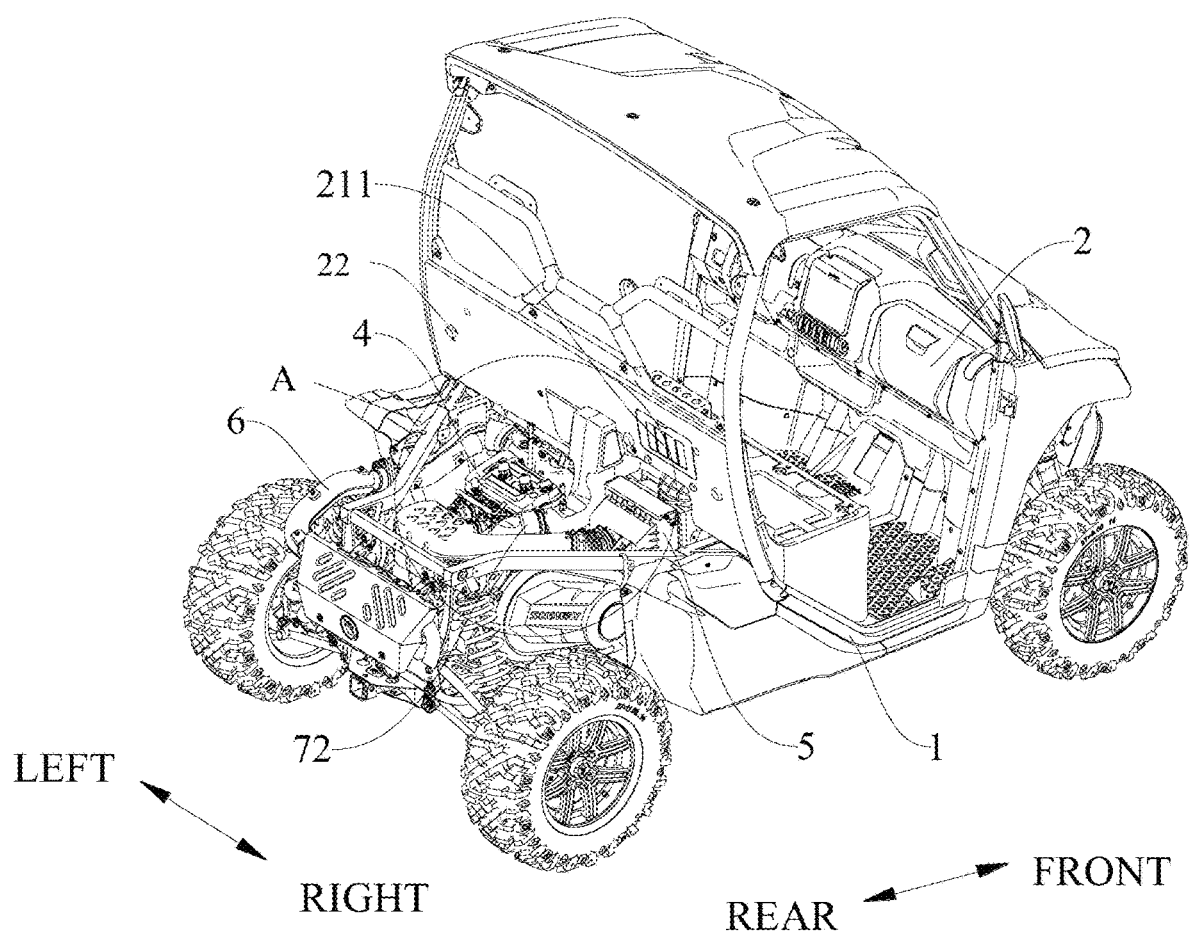
FIG. 2 is a schematic diagram of an all-terrain vehicle according to an embodiment of the present disclosure with a cargo compartment removed.
Figure 4:
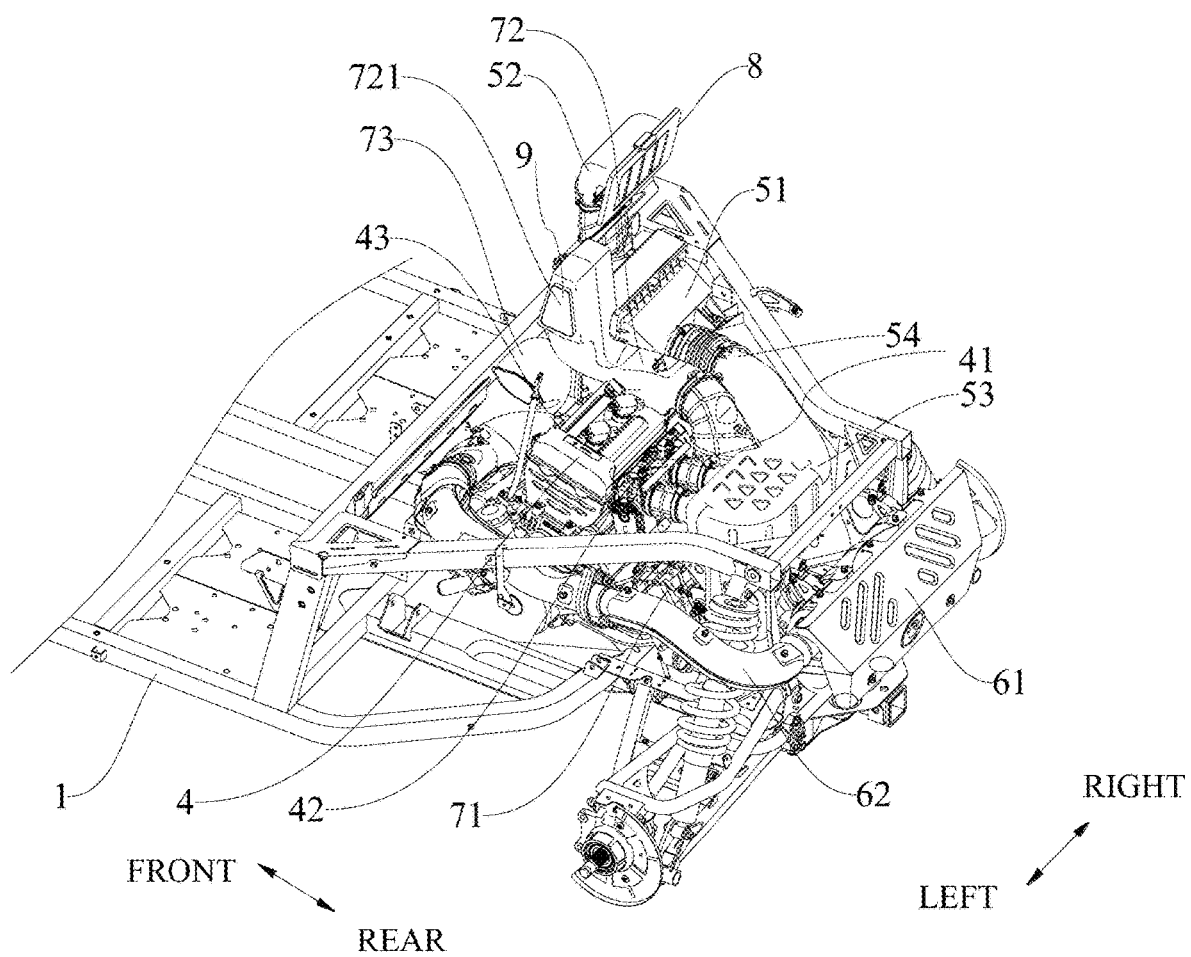
FIG. 4 is a partially schematic diagram of an all-terrain vehicle according to an embodiment of the present disclosure.

As illustrated in FIGS. 2 and 4, the engine 4 is mounted on the frame 1 and coupled to the frame 1, and is located under the cargo compartment 3. The engine 4 has an engine intake port 42 and an engine exhaust port 43, and air enters the engine 4 through the engine intake port 42 and combusts to generate power for use of the all-terrain vehicle. The engine exhaust port 43 and the engine intake port 42 are defined in two sides of a cylinder head of the engine 4 in the length direction of the frame 1. In at least one embodiment, the engine intake port 42 is defined in a front side of the engine 4, and the engine exhaust port 43 is defined in a rear side of the engine 4.

The air intake assembly 5 is coupled to the engine intake port 42, and outside air is processed by the air intake assembly 5 and enters the engine 4 for combustion. The exhaust assembly 6 is coupled to the engine exhaust port 43, and the exhaust assembly 6 is configured to process and discharge gases such as carbon dioxide generated after combustion in the engine 4.

The air intake assembly 5 is coupled to the engine intake port 42, and the air intake assembly 5 is substantially located at a side of the engine 4 in a width direction of the frame 1. The exhaust assembly 6 is coupled to the engine exhaust port 43, and the exhaust assembly 6 is substantially located at the other side of the engine 4 in the width direction of the frame 1 (e.g., a left-right direction indicated by an arrow in FIG. 1). In at least one embodiment, the air intake assembly 5 is substantially located at a right side of the engine 4, and the exhaust assembly 6 is substantially located at a left side of the engine 4.

The all-terrain vehicle according to embodiments of the present disclosure fully utilizes space around the engine 4, and has a compact overall structure and reasonable layout, improving space utilization of the all-terrain vehicle. In addition, the air intake assembly 5 and the exhaust assembly 6 are oppositely arranged at two sides of the engine 4, and heat radiation generated by high temperature gases in the exhaust assembly 6 can be prevented from affecting air temperature in the air intake assembly 5, improving performance of the engine 4.

As illustrated in FIGS. 2 and 4, in some embodiments, the air intake assembly 5 includes an air intake port 211, an air filter 51, a first air intake pipe 52, and an expansion chamber 53. The air filter 51 is arranged at the right side of the engine 4. A first end of the first air intake pipe 52 is coupled to the air intake port 211, a second end of the first air intake pipe 52 is coupled to the air filter 51. A first end of the expansion chamber 53 is coupled to the air filter 51, a second end of the expansion chamber 53 is coupled to the engine intake port 42, and the expansion chamber 53 is located at the rear side of the engine.

Figure 7:
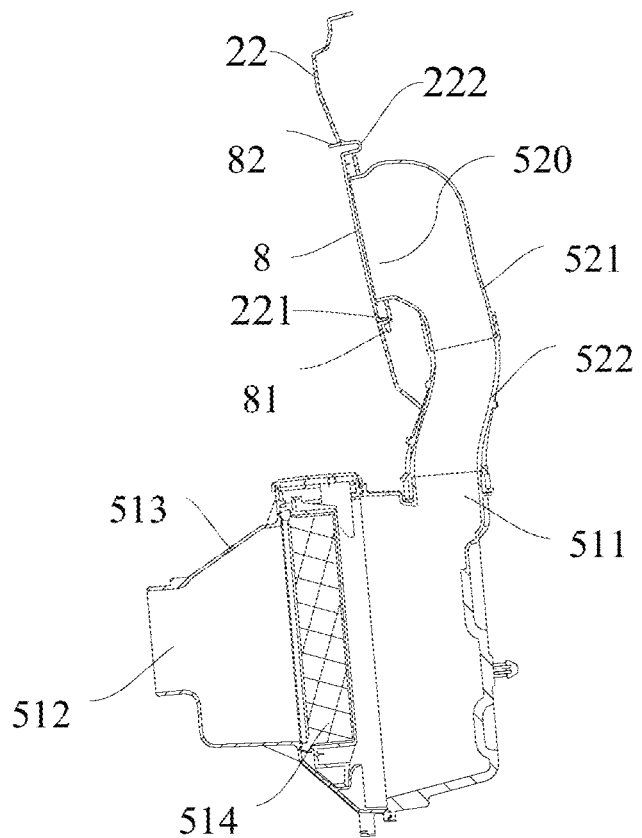
FIG. 7 is a sectional diagram of an air intake assembly of an all-terrain vehicle according to an embodiment of the present disclosure. an embodiment of the present disclosure.
Figure 8:
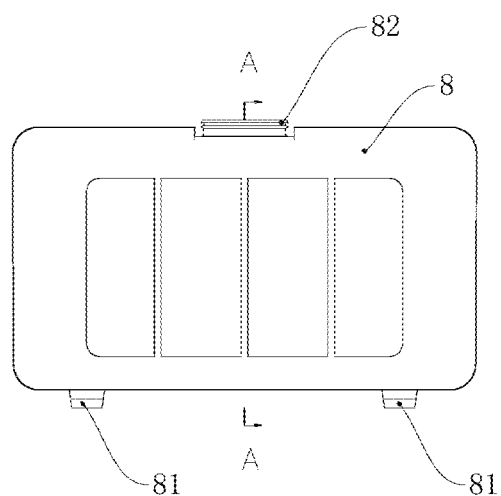
FIG. 8 is a front view of a filter shield according to an embodiment of the present disclosure.
Figure 9:
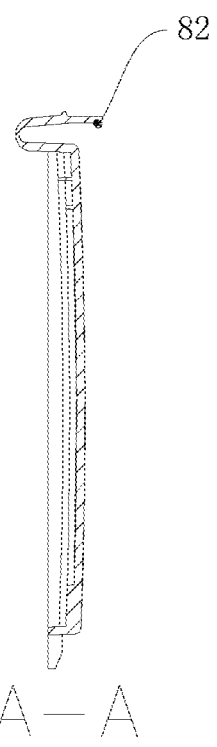
FIG. 9 is an A-A sectional diagram of a filter shield according to an embodiment of the present disclosure.
Figure 10:
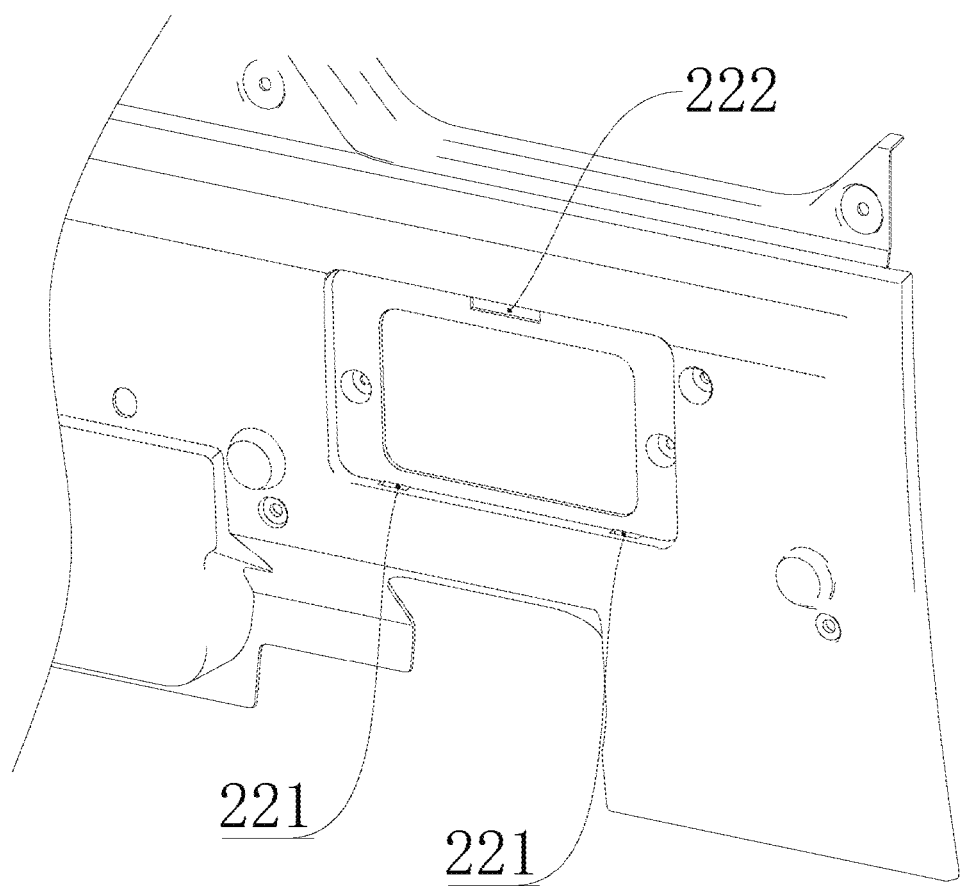
FIG. 10 is a partially schematic diagram of a backboard according to an embodiment of the present disclosure.
Figure 11:
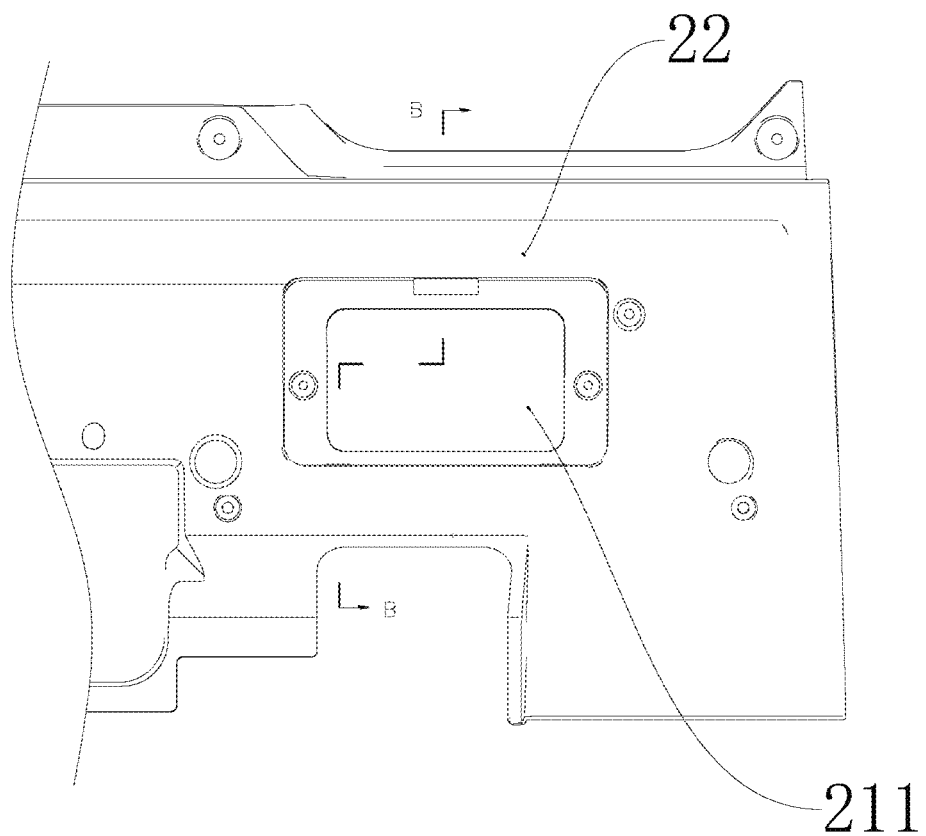
FIG. 11 is a partially front view of a backboard according to an embodiment of the present disclosure.
Figure 12:
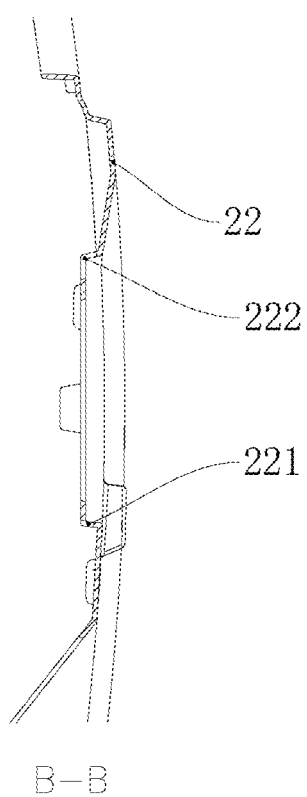
FIG. 12 is a B-B sectional diagram of a backboard according to an embodiment of the present disclosure.
Figure 13:
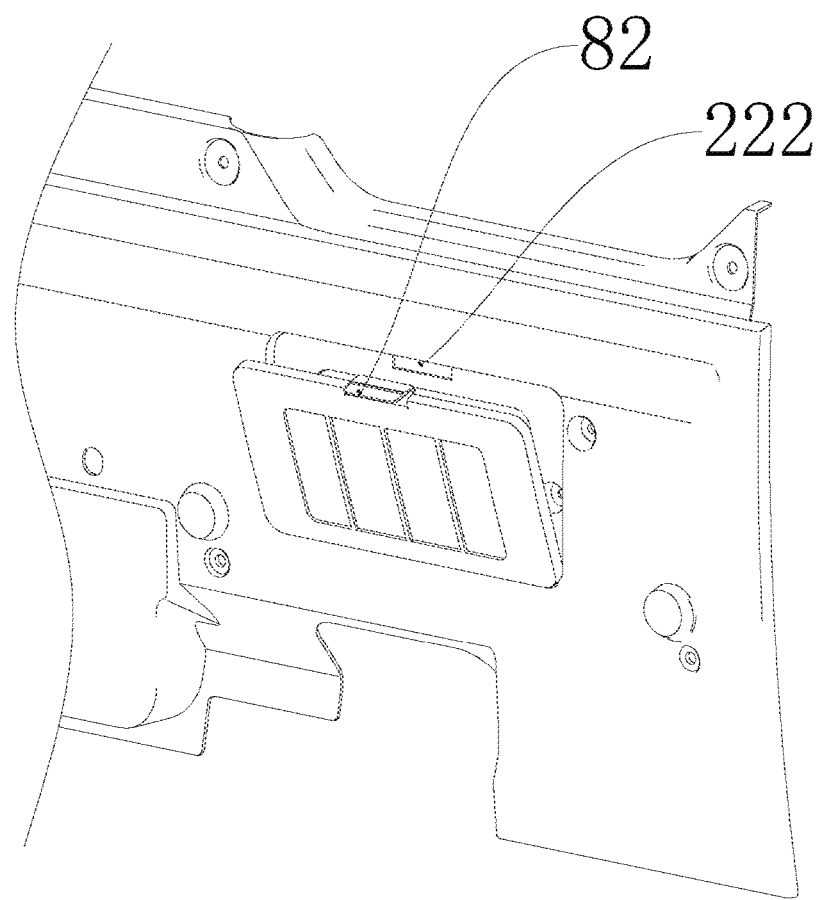
FIG. 13 is a schematic diagram of a backboard with a filter shield according to an embodiment of the present disclosure.

It could be understood that, the air filter 51 and the engine 4 are mounted on the frame 1, and the air filter 51 and the engine 4 are located under the cargo compartment 3. The air filter 51 is configured to filter the air, and the filtered air enters the engine 4 and combusts to generate power for use of the all-terrain vehicle. In an embodiment, as illustrated in FIG. 7, the air filter 51 has an air inlet hole 511 and an air outlet hole 512. The air inlet hole 511 of the air filter 51 is coupled to the air intake port 211 through the first air intake pipe 52, and the air outlet hole 512 of the air filter 51 is coupled to the engine 4.

In the all-terrain vehicle according to embodiments of the present disclosure, the air intake port 211 is defined in a backboard 22 of the passenger compartment 2, the backboard 22 is arranged along a height direction of the frame 1 and opposite the cargo compartment 3, and the air intake port 211 is not exposed. Thus, external pollutant entering air filter 51 through the air intake port 211 can be effectively reduced, service life of a filter element 514 of the air filter 51 can be prolonged, replacement frequency of the filter element 514 of the air filter 51 can be reduced, and use costs of the all-terrain vehicle can be reduced.

As illustrated in FIGS. 2 and 7, in some embodiments, the first end of the first air intake pipe 52 is coupled to the air intake port 211, the second end of the first air intake pipe 52 extends towards an inside of the passenger compartment 2, passes through the backboard 22 to an outside of the passenger compartment 2, and is coupled to the air inlet hole 511 of the air filter 51. In other words, the first air intake pipe 52 is coupled to the air intake port 211 at a side of the passenger compartment 2, and the first air intake pipe 52 passes through a lower portion of the backboard 22, and is coupled to the air inlet hole 511 of the air filter 51 under the cargo compartment 3.

In this way, a main body of the first air intake pipe 52 is located in the passenger compartment 2. Thus, limited space in the all-terrain vehicle is fully utilized, space of the rear portion of the frame 1 will not be occupied, normal use of the cargo compartment 3 will not be affected, and the design is reasonable.

Figure 6:
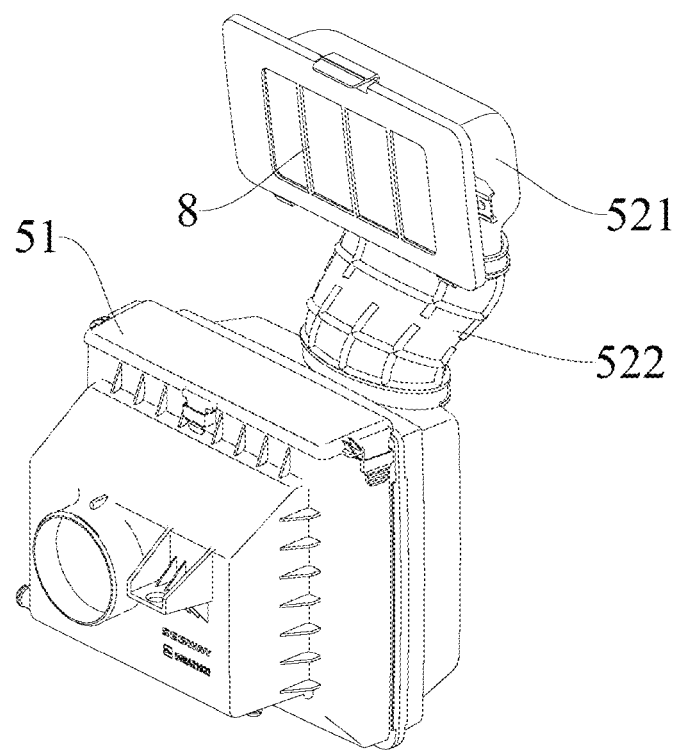
FIG. 6 is a schematic diagram of an air intake assembly of an all-terrain vehicle according to an embodiment of the present disclosure.

As illustrated in FIGS. 6 and 7, in some embodiments, the second end of the first air intake pipe 52 is coupled to the engine 4 through the air filter 51. The first air intake pipe 52 includes a first pipe segment 521 and a second pipe segment 522. A first end of the first pipe segment 521 (e.g., an upper end of the first pipe segment 521 in FIG. 7) is coupled to the air intake port 211, a second end of the first pipe segment 521 (e.g., a lower end of the first pipe segment 521 in FIG. 7) extends towards the inside of the passenger compartment 2 and is coupled to a first end of the second pipe segment 522 (e.g., an upper end of the second pipe segment 522 in FIG. 7), and a second end of the second pipe segment 522 (e.g., a lower end of the second pipe segment 522 in FIG. 7) passes through the backboard 22 and is coupled to the air inlet hole 511 of the air filter 51.

The first pipe segment 521 is made of a metal or plastic material having high hardness, to enhance rigidity of a connection portion of the first air intake pipe 52 and the air intake port 211, avoid deformation of the first air intake pipe 52 due to an external force, and assure stable coupling of the first air intake pipe 52 and the backboard 22. The second pipe segment 522 may be made of a rubber material. Thus, the first air intake pipe 52 can be bent under the backboard 22 and coupled to the air inlet hole 511 of the air filter 51 conveniently. The second pipe segment 522 can improve mounting error between the first air intake pipe 52 and the air filter 51, and facilitate assembly of the first air intake pipe 52 and the air filter 51. Furthermore, since the second pipe segment 522 has a buffering and shock absorption effect, probability of looseness and leakage at a junction between the first air intake pipe 52 and the air filter 51 can be reduced.

As illustrated in FIGS. 2 and 7, in some embodiments, the backboard 22 is close to the cargo compartment 3, and the backboard 22 defines the air intake port 211. A first air intake opening 520 of the first air intake pipe 52 is in communication with the air intake port 211, the first air intake pipe 52 extends from the air intake port 211 towards the inside of the passenger compartment 2, passes through the backboard 22 and couples to the engine 4 through the second end of the first air intake pipe 52. Therefore, in the all-terrain vehicle according to embodiments of the present disclosure, the first air intake pipe 52 can be fixed on the backboard 22, to improve firmness of the first air intake pipe 52.

In some embodiments, a height of the air intake port 211 is not greater than a height of the cargo compartment 3. The cargo compartment 3 can cover the air intake port 211 completely, to significantly reduce the probability of large particle impurities entering the air filter 51 through the air intake port 211, and prolong service life of the filter element 514 of the air filter 51.

Figure 3:
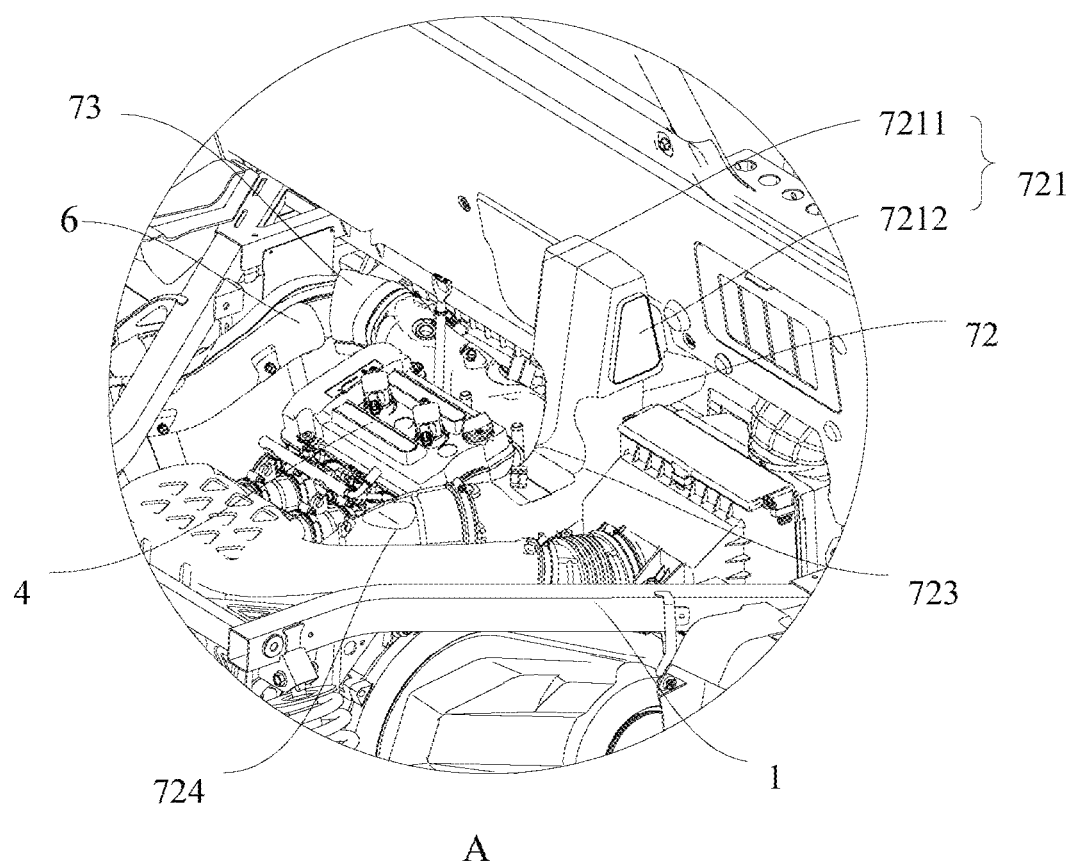
FIG. 3 is a partially enlarged diagram of portion A of the all-terrain vehicle illustrated in FIG. 2.

As illustrated in FIG. 3, in some embodiments, the all-terrain vehicle further includes a filter shield 8. The filter shield 8 is arranged at the air intake port 211, and the filter shield 8 has an effect of filtering impurities. Thus, the probability of large impurities entering the first air intake pipe 52 can be reduced, and the service life of the filter element 514 of the air filter 51 can be further prolonged.

As illustrated in FIG. 7-FIG. 13, in an embodiment, the filter shield 8 is detachably coupled to the backboard 22. For example, the backboard 22 defines a first groove 221 and a second groove 222, the filter shield 8 is provided with an insertion sheet 81 and an elastic sheet 82, the insertion sheet 81 is inserted into the first groove 221, and the elastic sheet 82 is elastically snap-fitted in the second groove 222. Thus, when the filter shield 8 needs to be cleaned, the filter shield 8 can be detached from the backboard 22, which is very convenient and improves utility of the all-terrain vehicle.

As illustrated in FIG. 7, in some embodiments, the air filter 51 includes a housing 513 and the filter element 514. The filter element 514 is arranged in the housing 513 along the height direction of the frame 1, a top of the housing 513 is provided with an end cap, and the filter element 514 can be replaced after the end cap is open.

It should be noted that, in an all-terrain vehicle of the related art, the filter element 514 of the air filter 51 is typically arranged horizontally, the air flows through the filter element 514 from bottom to top, and such arrangement has a high requirement for an up-down size of the space. In the present embodiment, due to limitation of the cargo compartment 3, a position for arrangement of the air filter 51 has a cramped up-down size. If the filter element 514 is arranged horizontally, the air filter 51 will have a small volume, and an air flow direction is not smooth, to affect air intake efficiency of the engine 4 and reduce performance of the engine 4. In the present embodiment, the filter element 514 of the air filter 51 is substantially arranged vertically, the air flows through the filter element 514 from front to rear. By means of such an arrangement, the volume of the air filter 51 is increased, overall airflow resistance of the air intake system is reduced, and the performance of the engine 4 is improved.

As illustrated in FIGS. 1 and 2, in some embodiments, the passenger compartment 2 is provided with a driver seat 23 and a passenger seat 24. The driver seat 23 and the passenger seat 24 are spaced apart in the width direction of the frame. The air intake port 211 may be arranged behind the driver seat 23, or behind the passenger seat 24, or between the driver seat 23 and the passenger seat 24. The specific position of the air intake port 211 can be chosen according to practical situations.

Figure 5:
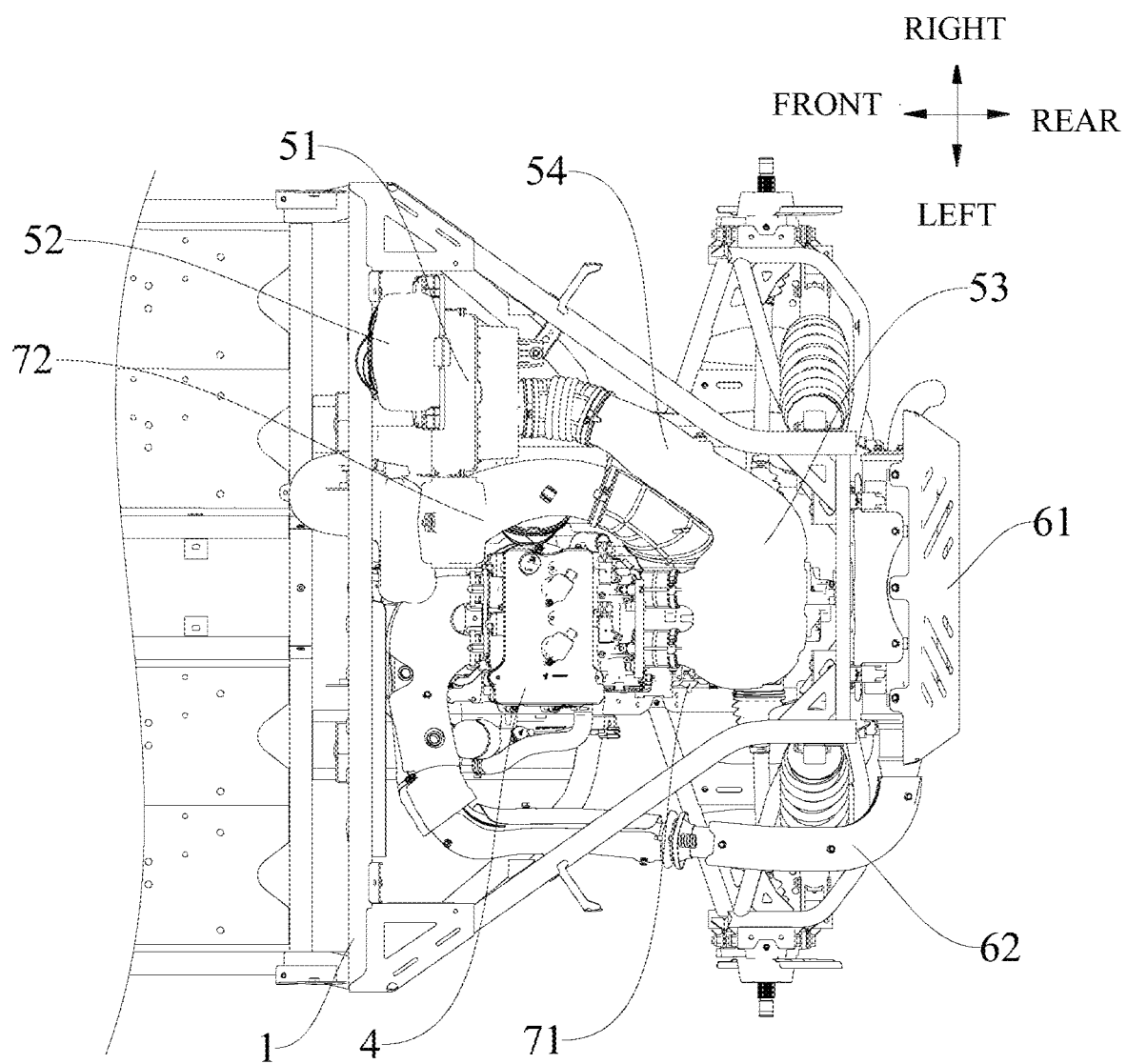
FIG. 5 is a partially top view of an all-terrain vehicle according to an embodiment of the present disclosure.

As illustrated in FIGS. 4 and 5, in some embodiments, the first end of the expansion chamber 53 is coupled to the air outlet hole 512 of the air filter 51, the engine 4 is provided with a throttle valve 41, and the second end of the expansion chamber 53 is coupled to the throttle valve 41. The throttle valve 41 is a controllable valve for controlling the air entering the engine 4, and the air will mix with gasoline after entering the engine 4 and become a combustible gas mixture for combustion and work.

In the all-terrain vehicle according to embodiments of the present disclosure, the expansion chamber 53 is arranged between the engine 4 and the air filter 51, and the expansion chamber 53 is an irregular chamber. Thus, the air flowing from the air filter 51 to the engine 4 expands due to an increased space when passing through the expansion chamber 53, the resistance can be reduced, desired stable combustion air can be provided for the engine 4, and operational stability of the engine 4 can be facilitated. Furthermore, the expansion chamber 53 may have a buffering effect on the intake air, to further reduce noises of the engine 4 due to the intake air.

In some embodiments, the expansion chamber 53 has a first channel for passage of air, the throttle valve 41 has a second channel for passage of air, and a ratio of a minimum cross-sectional area of the first channel to a cross-sectional area of the second channel is greater than or equal to 1.4.

It is found by the inventor that, when the ratio of the minimum cross-sectional area of the first channel to the cross-sectional area of the second channel is greater than or equal to 1.4, the air intake system of the engine 4 has a small resistance and high air intake efficiency, and power of the engine 4 is high. When the above ratio is less than 1.4, the air intake system of the engine 4 has an increased resistance, and the power of the engine 4 drops.

As illustrated in FIGS. 4 and 5, in some embodiments, the engine exhaust port 43 is defined in the front side of the cylinder head of the engine 4. The exhaust assembly 6 includes a muffler 61 and an exhaust pipe 62, the muffler 61 is arranged at a side of the engine 4 away from the passenger compartment 2, and the muffler 61 is arranged along the width direction of the frame 1. A first end of the exhaust pipe 62 is coupled to the engine exhaust port 43, the exhaust pipe 62 extends along the length direction of the frame 1, and a second end of the exhaust pipe 62 is coupled to the muffler 61.

The muffler 61 is configured to reduce noises generated by the engine 4. The muffler 61 is located at the rear portion of the frame 1 and arranged along the width direction of the frame 1 to fully utilize the space of the rear portion of the frame 1. The exhaust pipe 62 extends on the left side of the engine 4 and is coupled to the muffler 61, to avoid getting close to the air intake assembly 5.

As illustrated in FIGS. 4 and 5, in some embodiments, the air intake assembly 5 further includes a second air intake pipe 54. A first end of the second air intake pipe 54 is coupled to the expansion chamber 53, a second end of the second air intake pipe 54 is coupled to the air filter 51, and the second air intake pipe 54 is integrally formed with the expansion chamber 53. The air filtered by the air filter 51 passes through the second air intake pipe 54 and the expansion chamber 53 sequentially and enters the engine 4.

As illustrated in FIGS. 3 and 4, in some embodiments, the all-terrain vehicle further includes a transmission 71. The engine 4 and the transmission 71 are arranged under the cargo compartment 3, the transmission 71 is drivingly coupled to the engine 4, and the transmission 71 is arranged at a side of the engine 4. In an embodiment, the transmission 71 and the air intake assembly 5 are located at a same side of the engine 4 in the width direction, and the air filter 51 and the second air intake pipe 54 are located above the transmission 71. In this way, the all-terrain vehicle has a more compact structure and a reasonable layout, improving space utilization of the all-terrain vehicle.

In some embodiments, the all-terrain vehicle further includes a transmission air intake pipe 72. A first end of the transmission air intake pipe 72 defines a transmission air intake port 721, a second end of the transmission air intake pipe 72 is coupled to an air inlet hole (not illustrated) in the transmission, and the transmission air intake port 721 is arranged between the cargo compartment 3 and the passenger compartment 2. The transmission air intake pipe 72 and the second air intake pipe 54 are located at a same side of the engine 4 in the width direction of the frame 1.

The all-terrain vehicle further includes a transmission exhaust pipe 73. The transmission has a transmission exhaust hole (not illustrated), the transmission exhaust pipe 73 is coupled to the transmission exhaust hole, and an outlet direction of the transmission exhaust pipe 73 is oriented towards the exhaust assembly 6.

In this way, the space of the all-terrain vehicle is fully utilized, layout of inlet pipelines of the engine 4 and the transmission 71 of the all-terrain vehicle is optimized, and space utilization of the all-terrain vehicle is improved.

As illustrated in FIGS. 3 and 4, in some embodiments, the second end of the transmission air intake pipe 72 (e.g., a rear end of the transmission air intake pipe 72 in FIG. 4) is in communication with the transmission 71, and the first end of the transmission air intake pipe 72 (e.g., a front end of the transmission air intake pipe 72 in FIG. 4) defines a plurality of transmission air intake ports 721. The transmission exhaust pipe 73 has a first end and a second end, the first end of the transmission exhaust pipe 73 is in communication with the transmission 71, and the second end of the transmission exhaust pipe 73 is in communication with an outside atmosphere.

It could be understood that, the transmission 71 receives intake air through the plurality of transmission air intake ports 721 of the transmission air intake pipe 72 at the same time, to cool an interior of the transmission 71, and then the air is discharged from the second end of the transmission exhaust pipe 73.

The all-terrain vehicle according to embodiments of the present disclosure can receive intake air through the transmission air intake port 721 and the transmission air intake pipe 72 to cool the transmission 71, and reduce temperature of the transmission 71. It should be noted that, a plurality of transmission air intake ports 721 are provided, to improve air intake efficiency, accelerate the cooling of the transmission 71, and improve heat dissipation performance of the transmission 71.

As illustrated in FIGS. 3 and 4, in an embodiment, at least part of the transmission air intake ports 721 is oriented towards a left side or a right side of the all-terrain vehicle. In other words, at least part of the transmission air intake ports 721 is open along a width direction of the all-terrain vehicle (e.g., a left-right direction in FIG. 2). For example, the plurality of transmission air intake ports 721 includes a first transmission air intake port 7211 and a second transmission air intake port 7212. The first transmission air intake port 7211 is open towards the left side along the width direction of the all-terrain vehicle, and the second transmission air intake port 7212 is open towards the right side along the width direction of the all-terrain vehicle. In some embodiments, the first end of the transmission air intake pipe 72 is provided with an air intake pipe head, and the air intake pipe head has a substantially rectangular pyramid shape. The first transmission air intake port 7211 and the second transmission air intake port 7212 are defined in left and right sides of the air intake pipe head in the width direction of the all-terrain vehicle, respectively. It could be understood that, when the all-terrain vehicle moves forward or backward, the airflow around the first transmission air intake port 7211 and the second transmission air intake port 7212 has small disturbance, to assure smoothness of the first transmission air intake port 7211 and the second transmission air intake port 7212 during the air intake, and in some embodiments improve heat dissipation performance of the transmission 71.

As illustrated in FIGS. 3 to 5, in some embodiments, the transmission 71 is a continuously variable transmission (CVT). The transmission 71 defines a plurality of air inlet holes (not illustrated), the second end of the transmission air intake pipe 72 defines a plurality of communication openings (not illustrated), and the plurality of communication openings are in communication with the plurality of air inlet holes in one-to-one correspondence. For example, the air inlet holes of the transmission 71 includes a first air inlet hole and a second air inlet hole, and the communication openings of the transmission air intake pipe 72 includes a first communication opening and a second communication opening. The first communication opening is coupled to the first air inlet hole, and the second communication opening is coupled to the second air inlet hole. It could be understood that, transmission air intake pipe 72 can supply the air to the transmission 71 through the first communication opening and the second communication opening at the same time, to in some embodiments accelerate cooling of the transmission 71, and improve heat dissipation performance of the transmission 71.

As illustrated in FIGS. 3 and 4, in an embodiment, the transmission air intake pipe 72 includes a hard pipe segment 723 and a soft pipe segment 724. A first end of the soft pipe segment 724 is in communication with the transmission 71, a second end of the soft pipe segment 724 is in communication with a first end of the hard pipe segment 723, and the plurality of transmission air intake ports 721 are defined in a second end of the hard pipe segment 723. For example, the hard pipe segment 723 is made of a metal or plastic, to improve rigidity of the transmission air intake pipe 72 and avoid deformation of the transmission air intake pipe 72 due to an external force. The soft pipe segment 724 is made of a rubber, and the soft pipe segment 724 is located between the hard pipe segment 723 and the transmission 71. Thus, the mounting error between the transmission air intake pipe 72 and the transmission 71 can be improved, and assembly of the transmission air intake pipe 72 and the transmission 71 can be facilitated. Moreover, since the soft pipe segment 724 has a buffering and shock absorption effect, the probability of looseness and leakage at the junction between the transmission air intake pipe 72 and the transmission 71 can be reduced.

As illustrated in FIG. 4, in some embodiments, the all-terrain vehicle further includes two filtering screens 9. The two filtering screens 9 are arranged at the first transmission air intake port 7211 and the second transmission air intake port 7212, respectively. Thus, the all-terrain vehicle according to embodiments of the present disclosure can reduce probability of the large impurities entering the transmission air intake pipe 72 by blocking effect of the filtering screens 9, to further improve operational stability of the all-terrain vehicle.

As illustrated in FIGS. 2 to 5, in some embodiments, the second end of the transmission exhaust pipe 73 is open towards the exhaust assembly 6. It could be understood that, the air in the transmission 71 is discharged via an opening of the second end of the transmission exhaust pipe 73. Since the opening of the second end of the transmission exhaust pipe 73 is oriented towards the exhaust assembly 6, the temperature of the exhaust assembly 6 can be reduced, and the heat dissipation of the exhaust assembly 6 can be facilitated.

As illustrated in FIGS. 1 to 3, in some embodiments, the all-terrain vehicle further includes a passenger compartment 2 and a cargo compartment 3. The passenger compartment 2 and the cargo compartment 3 are spaced apart in a length direction of the all-terrain vehicle (e.g., a front-rear direction in FIG. 1), and the transmission air intake port 721 is located between the passenger compartment 2 and the cargo compartment 3. Thus, the layout of air intake and exhaust of the all-terrain vehicle is optimized, and the space utilization of the all-terrain vehicle is improved. In at least one embodiment, a height of the transmission air intake port 721 is not greater than a height of the cargo compartment 3, and thus probability of the large impurities entering the transmission air intake pipe 72 is reduced.

As illustrated in FIG. 4, a second end of the first air intake pipe 52 (e.g., a rear end of the first air intake pipe 52 in FIG. 4) is in communication with the engine 4, and a first end of the first air intake pipe 52 (e.g., a front end of the first air intake pipe 52 in FIG. 4) defines a first air intake opening 520. A second end of the transmission air intake pipe 72 (e.g., a rear end of the transmission air intake pipe 72 in FIG. 4) is in communication with the transmission 71, and a first end of the transmission air intake pipe 72 (e.g., a front end of the transmission air intake pipe 72 in FIG. 4) defines a transmission air intake port 721. At least one of the first air intake opening 520 and the transmission air intake port 721 is located between the passenger compartment 2 and the cargo compartment 3. For example, a gap 21 is defined between the passenger compartment 2 and the cargo compartment 3. The first air intake opening 520 and the transmission air intake port 721 are arranged in the gap 21.

In the all-terrain vehicle according to embodiments of the present disclosure, at least one of the first air intake opening 520 and the transmission air intake port 721 is located between the passenger compartment 2 and the cargo compartment 3, the layout of air intake pipelines of the engine 4 and the transmission 71 of the all-terrain vehicle is optimized, the space utilization of the all-terrain vehicle is improved, and the air intake of the first air intake pipe 52 and the transmission air intake pipe 72 is facilitated, to make the engine 4 and the transmission 71 have better heat dissipation performance.

As illustrated in FIGS. 1 and 2, in an embodiment, a height of the first air intake opening 520 is not greater than a height of the cargo compartment 3, and a height of the transmission air intake port 721 is not greater than the height of the cargo compartment 3. Thus, the probability of the large impurities entering the first air intake pipe 52 and the transmission air intake pipe 72 is reduced, and the stability of the engine 4 and the transmission 71 in use is improved.

As illustrated in FIGS. 2 and 3, in some embodiments, the first air intake opening 520 is open towards the cargo compartment 3. It could be understood that, the first air intake opening 520 is open towards the rear portion of the all-terrain vehicle, and the air supply of the first air intake opening 520 to the first air intake pipe 52 can be facilitated, to improve heat dissipation performance of the engine 4.

As illustrated in FIGS. 2 and 3, in some embodiments, the transmission air intake port 721 is open along the width direction of the frame 1. For example, two transmission air intake ports 721 are provided, and the two transmission air intake ports 721 are open towards a left side and a right side of the frame 1 in the width direction, respectively. When the all-terrain vehicle moves forward or backward, the airflow around the transmission air intake port 721 has small disturbance, and the smoothness of air intake of the transmission air intake port 721 can be assured, to improve heat dissipation performance of the transmission 71.

In an embodiment, as illustrated in FIG. 2, the passenger compartment 2 includes a driver seat 23 and a passenger seat 24, the first air intake opening 520 is located behind the passenger seat 24, and the transmission air intake port 721 is located between the driver seat 23 and the passenger seat 24. Therefore, the all-terrain vehicle according to embodiments of the present disclosure can optimize mounting positions of the first air intake opening 520 and the transmission air intake port 721, improve the space utilization of the all-terrain vehicle, and facilitate air intake of the first air intake pipe 52 and the transmission air intake pipe 72, to make the all-terrain vehicle have better heat dissipation performance.

In the specification, it is to be understood that terms such as "central," "longitudinal," "lateral," "length," "width," "thickness," "upper," "lower," "front," "rear," "left," "right," "vertical," "horizontal," "top," "bottom," "inner," "outer," "clockwise," "counterclockwise," "axial," "radial" and "circumferential" should be construed to refer to the orientation as then described or as shown in the drawings under discussion. These relative terms are for convenience of description and do not require that the present disclosure be constructed or operated in a particular orientation.

In addition, terms such as "first" and "second" are used herein for purposes of description and are not intended to indicate or imply relative importance or significance or to imply the number of indicated technical features. Thus, the feature defined with "first" and "second" may comprise at least one this feature. In the description of the present disclosure, "a plurality of" means at least two, for example, two, three, etc., unless specified otherwise.

In the present disclosure, unless specified or limited otherwise, the terms "mounted," "connected," "coupled," "fixed" and the like are used broadly, and may be, for example, fixed connections, detachable connections, or integral connections; may also be mechanical or electrical connections; may also be direct connections or indirect connections via intervening structures; may also be inner communications of two elements, which can be understood by those skilled in the art according to specific situations.

In the present application, unless specified or limited otherwise, a structure in which a first feature is "on" or "below" a second feature may include an embodiment in which the first feature is in direct contact with the second feature, and may also include an embodiment in which the first feature and the second feature are in indirect contact with each other via an intermediate medium. Furthermore, a first feature "on," "above," or "on top of" a second feature may include an embodiment in which the first feature is right or obliquely "on," "above," or "on top of" the second feature, or just means that the first feature is at a height higher than that of the second feature; while a first feature "below," "under," or "on bottom of" a second feature may include an embodiment in which the first feature is right or obliquely "below," "under," or "on bottom of" the second feature, or just means that the first feature is at a height lower than that of the second feature.

In the present disclosure, reference to term such as "an embodiment," "some embodiments," "an example," "a specific example," or "some examples," means that a particular feature, structure, material, or characteristic described in connection with the embodiment or example is included in at least one embodiment or example of the present disclosure. Schematic representations of the above terms throughout this specification are not necessarily referring to the same embodiment or example. Furthermore, the particular features, structures, materials, or characteristics may be combined in any suitable manner in one or more embodiments or examples. In addition, under the condition of not contradicting each other, those skilled in the art can incorporate and combine different embodiments or examples and features of different embodiments or examples described in this specification.

Although explanatory embodiments have been shown and described, it would be appreciated by those skilled in the art that the above embodiments cannot be construed to limit the present disclosure, and changes, alternatives, and modifications can be made in the embodiments without departing from spirit, principles and scope of the present disclosure.

What is claimed is:

1. An all-terrain vehicle, comprising:
   a frame;
   a passenger compartment and a cargo compartment, the passenger compartment and the cargo compartment being mounted on the frame along a length direction of the frame;
   an engine coupled to the frame and located under the cargo compartment, the engine having an engine intake port and an engine exhaust port arranged in two sides of a cylinder head of the engine in the length direction of the frame, respectively;
an air intake assembly coupled to the engine intake port, the air intake assembly being substantially located at a first side of a cylinder head of the engine in a width direction of the frame; and
an exhaust assembly coupled to the engine exhaust port, the exhaust assembly being substantially located at a second side of the cylinder head of the engine in the width direction of the frame.

2. The all-terrain vehicle according to claim 1, wherein the air intake assembly comprises an air intake port, an air filter and a first air intake pipe, and the first air intake pipe has a first end coupled to the air intake port and a second end coupled to the air filter.

3. The all-terrain vehicle according to claim 2, wherein the passenger compartment is provided with a backboard, the air intake port is defined in the backboard, the first end of the first air intake pipe is coupled to the air intake port, the second end of the first air intake pipe extends towards an inside of the passenger compartment, passes through the backboard to an outside of the passenger compartment, and is coupled to the air filter.

4. The all-terrain vehicle according to claim 3, wherein the air intake port and the air filter are arranged at a rear side of the passenger compartment, and the air filter is located under the air intake port.

5. The all-terrain vehicle according to claim 2, wherein the engine exhaust port is defined in a front side of the cylinder head of the engine, the exhaust assembly comprises an exhaust pipe and a muffler, the exhaust pipe has a first end coupled to the engine exhaust port and a second end extending along the second side of the engine in the width direction of the frame to an area behind the engine and coupled to the muffler.

6. The all-terrain vehicle according to claim 5, wherein the muffler is arranged along the width direction of the frame, and the muffler is located behind the engine.

7. The all-terrain vehicle according to claim 2, wherein the all-terrain vehicle further comprises an expansion chamber and a second air intake pipe, the expansion chamber has a first end coupled to the air filter and a second end coupled to the engine intake port, the expansion chamber is located at a side of the engine away from the passenger compartment in the length direction of the frame, the second air intake pipe has a first end coupled to the expansion chamber and a second end coupled to the air filter, and the second air intake pipe is integrally formed with the expansion chamber.

8. The all-terrain vehicle according to claim 7, wherein the engine comprises a transmission, the transmission and the air intake assembly are located at a same side of the engine in the width direction, and the air filter and the second air intake pipe are located above the transmission.

9. The all-terrain vehicle according to claim 8, further comprising a transmission air intake pipe, the transmission air intake pipe having a first end defining a transmission air intake port and a second end coupled to an air inlet hole in the transmission, the transmission air intake port being arranged between the cargo compartment and the passenger compartment.

10. The all-terrain vehicle according to claim 9, wherein the transmission air intake pipe and the second air intake pipe are located at a same side of the engine in the width direction of the frame.

11. The all-terrain vehicle according to claim 8, further comprising a transmission exhaust pipe, the transmission having a transmission exhaust hole, the transmission exhaust pipe being coupled to the transmission exhaust hole, the transmission exhaust pipe having an outlet direction oriented towards the exhaust assembly.

12. An all-terrain vehicle, comprising:
a frame;
a passenger compartment and a cargo compartment, the passenger compartment and the cargo compartment being arranged along a length direction of the frame, the passenger compartment being provided with a backboard close to the cargo compartment, the backboard defining an air intake port;
an air filter and an engine, the air filter and the engine being mounted on the frame and located under the cargo compartment, the air filter having an air inlet hole and an air outlet hole, the air outlet hole being coupled to the engine; and
a first air intake pipe having a first end coupled to the air intake port and a second end coupled to the air inlet hole;
wherein the air intake port has a height not greater than a height of the cargo compartment.

13. The all-terrain vehicle according to claim 12, wherein the first end of the first air intake pipe is coupled to the air intake port, the second end of the first air intake pipe extends towards an inside of the passenger compartment, passes through the backboard, and is coupled to the air inlet hole of the air filter.

14. The all-terrain vehicle according to claim 13, wherein the first air intake pipe comprises a first pipe segment and a second pipe segment, the first pipe segment has a first end coupled to the air intake port and a second end extending towards the inside of the passenger compartment and coupled to a first end of the second pipe segment, and the second pipe segment has a second end passing through the backboard and coupled to the air inlet hole of the air filter.

15. The all-terrain vehicle according to claim 12, further comprising a filter shield arranged at the air intake port, the filter shield being detachably coupled to the backboard.

16. The all-terrain vehicle according to claim 15, wherein the backboard defines a first groove and a second groove, the filter shield is provided with an insertion sheet and an elastic sheet, the insertion sheet is fitted in the first groove, and the elastic sheet is elastically snap-fitted in the second groove.

17. The all-terrain vehicle according to claim 12, further comprising an expansion chamber, the expansion chamber having a first end coupled to the air outlet hole, the engine having a throttle valve, the expansion chamber having a second end coupled to the throttle valve.

18. An all-terrain vehicle, comprising:
a frame;
a passenger compartment and a cargo compartment, the passenger compartment being located at a front side of the cargo compartment;
an engine and a transmission, the engine and the transmission being arranged under the cargo compartment, the transmission being drivingly coupled to the engine; and
a first air intake pipe and a transmission air intake pipe, the first air intake pipe having a first end defining a first air intake opening and a second end in communication with the engine, the transmission air intake pipe having a first end defining a transmission air intake port and a second end in communication with the transmission, wherein the first air intake opening and the transmission air intake port are located between the passenger compartment and the cargo compartment.

19. The all-terrain vehicle according to claim 18, wherein at least one of the first air intake opening and the transmission air intake port has a height not greater than a height of the cargo compartment.

* * * * *